US010417201B2

(12) United States Patent
Graham et al.

(10) Patent No.: US 10,417,201 B2
(45) Date of Patent: Sep. 17, 2019

(54) SYSTEMS AND METHODS FOR ADAPTIVELY IDENTIFYING AND MITIGATING STATISTICAL OUTLIERS IN AGGREGATED DATA

(71) Applicant: FINCA International, Inc., Washington, DC (US)

(72) Inventors: Scott Graham, Washington, DC (US); Anahit Tevosyan, Chevy Chase, MD (US)

(73) Assignee: FINCA INTERNATIONAL, INC, Washington, DC (US)

( * ) Notice: Subject to any disclaimer, the term of this patent is extended or adjusted under 35 U.S.C. 154(b) by 477 days.

(21) Appl. No.: 14/826,019

(22) Filed: Aug. 13, 2015

(65) Prior Publication Data
US 2016/0048552 A1    Feb. 18, 2016

Related U.S. Application Data

(60) Provisional application No. 62/036,789, filed on Aug. 13, 2014.

(51) Int. Cl.
*G06F 16/215* (2019.01)
*G06Q 30/02* (2012.01)

(52) U.S. Cl.
CPC .......... *G06F 16/215* (2019.01); *G06Q 30/02* (2013.01)

(58) Field of Classification Search
USPC ....................................................... 707/690
See application file for complete search history.

(56) References Cited

U.S. PATENT DOCUMENTS

| | | | | |
|---|---|---|---|---|
| 7,804,947 B2 * | 9/2010 | Brown | ................. | H04Q 3/0075 370/216 |
| 8,250,407 B1 * | 8/2012 | Garcia | ................. | G06F 11/327 714/15 |
| 9,148,458 B2 * | 9/2015 | Verkasalo | .............. | G06Q 30/02 |
| 9,779,260 B1 * | 10/2017 | Brisebois | ................ | G06F 21/62 |
| 2005/0259590 A1 * | 11/2005 | Brown | ................. | H04Q 3/0075 370/250 |
| 2006/0003306 A1 * | 1/2006 | McGinley | ................ | G09B 3/00 434/350 |
| 2006/0253831 A1 * | 11/2006 | Harper | ...................... | G06F 9/54 717/106 |

(Continued)

*Primary Examiner* — Cam Linh T Nguyen
(74) *Attorney, Agent, or Firm* — Finnegan, Henderson, Farabow, Garrett & Dunner, LLP

(57) ABSTRACT

The disclosed embodiments include computerized methods and systems that facilitate automated detection and precision correction of aggregated data collected by multiple, geographically dispersed mobile communications devices. In one embodiment, an apparatus detect a data outlier within portions of the aggregated data having numerical and/or categorical values. The apparatus may transmit information identifying the data outliner and a portion of the aggregated data that includes the data outlier to an additional communications device, which may present the aggregated data portion to a user in a manner that visually distinguishes the data outlined from other elements of aggregated data. In response to a request from the additional communications device, the apparatus may modify portions of the aggregated data in an effort to mitigate the data outlier.

20 Claims, 6 Drawing Sheets

(56) References Cited

U.S. PATENT DOCUMENTS

| | | | |
|---|---|---|---|
| 2008/0052259 A1* | 2/2008 | Shiffman | G06N 5/025 706/47 |
| 2009/0043690 A1* | 2/2009 | MacLellan | G06Q 40/02 705/38 |
| 2012/0005527 A1* | 1/2012 | Engel | H04H 60/64 714/15 |
| 2012/0102002 A1* | 4/2012 | Sathyanarayana | G06F 17/30303 707/687 |
| 2013/0054497 A1* | 2/2013 | Garland | G06N 99/005 706/12 |
| 2013/0073525 A1* | 3/2013 | Damon | G06F 11/0706 707/691 |
| 2015/0294245 A1* | 10/2015 | Nagar | G06Q 10/063 705/7.11 |

* cited by examiner

SYSTEMS AND METHODS FOR ADAPTIVELY IDENTIFYING AND MITIGATING STATISTICAL OUTLIERS IN AGGREGATED DATA

CROSS-REFERENCE TO RELATED APPLICATION

This application claims the benefit of priority to U.S. Provisional Patent Application No. 62/036,789, filed Aug. 13, 2014, the entire disclosure of which is expressly incorporated herein by reference to its entirety.

BACKGROUND

Technical Field

The disclosed embodiments generally relate to computerized systems and methods for data collection and data analysis, and more particularly, and without limitation, to computerized systems and methods for adaptively identifying and mitigating statistical outliers in aggregated data.

Background Information

Many organizations, such as financial and micro-finance institutions, governmental entities, non-governmental entities, research institutions, and regulatory bodies, collect, aggregate, and analyze data to quantify an impact of their activities upon individuals and business within various geographic regions. In many instances, however, significant logistical, financial, and methodological challenges block avenues by which many organizations may obtain appropriate and reliable data that quantifies an Impact of provided financial services on a particular population.

SUMMARY

The disclosed embodiments include computer-implemented systems and methods that adaptively identify data outliers within aggregated data and modify portions of the aggregated data to mitigate the data outliers.

In some instances, the disclosed embodiments include an apparatus that includes a storage device and at least one processor coupled to the storage device. The storage device may store software instructions for controlling the at least one processor when executed by the at least one processor, and the at least one processor may be operative with the software instructions and configured to obtain aggregated data collected by a plurality of first communications devices. At least one processor may be further configured to detect at least one data outlier within the aggregated data. In some aspects, the data outlier corresponds to at least one element of the aggregated data. At least one processor may be further configured to transmit information identifying the data outlier and at least a portion of the aggregated data that includes the data outlier to a second communications device. The information may, in some aspects, instruct the second communications device to present the aggregated data portion to a user, and the data outlier may be visually distinguishable within the presented aggregated data portion. In response to the transmitted information, at least one processor may be further configured to receive a request to modify the aggregated data from the second communications device, and to perform operations that modify at least a portion of the aggregated data in accordance with the received request.

In further embodiments, a computer-implemented method may include obtaining, by at least one processor, aggregated data collected by a plurality of first communications devices. The method may also include detecting, by at least one processor, at least one data outlier within the aggregated data. In one aspect, the data outlier may correspond to at least one element of the aggregated data. The method also generates, by at least one processor, an electronic command to transmit information identifying the data outlier and at least a portion of the aggregated data that includes the data outlier to a second communications device. In some aspects, the information may instruct the second communications device to present the aggregated data portion to a user, and the data outlier may be visually distinguishable within the presented aggregated data portion. In response to the transmitted information, the method may include receiving, by at least one processor, a request to modify the aggregated data from the second communications device, and performing, by the least one processor, operations that modify at least a portion of the aggregated data in accordance with the received request.

In additional embodiments, a tangible, non-transitory computer-readable medium may store instructions that, when executed by at least one processor, perform a method that obtains aggregated data collected by a plurality of first communications devices. The method may also include detecting at least one data outlier within the aggregated data. In one aspect, the data outlier may correspond to at least one element of the aggregated data. The method also generates an electronic command to transmit information identifying the data outlier and at least a portion of the aggregated data that includes the data outlier to a second communications device. In some aspects, the information may instruct the second communications device to present the aggregated data portion to a user, and the data outlier may be visually distinguishable within the presented aggregated data portion. In response to the transmitted information, the method may include receiving a request to modify the aggregated data from the second communications device, and performing operations that modify at least a portion of the aggregated data in accordance with the received request.

It is to be understood that both the foregoing general description and the following detailed description are exemplary and explanatory only, and are not restrictive of the disclosed embodiments as claimed. Further, the accompanying drawings, which are incorporated in and constitute a part of this specification, illustrate aspects of the present disclosure and together with the description, serve to explain principles of the disclosed embodiments as set forth in the accompanying claims.

DESCRIPTION OF THE EMBODIMENTS

Figure 1:
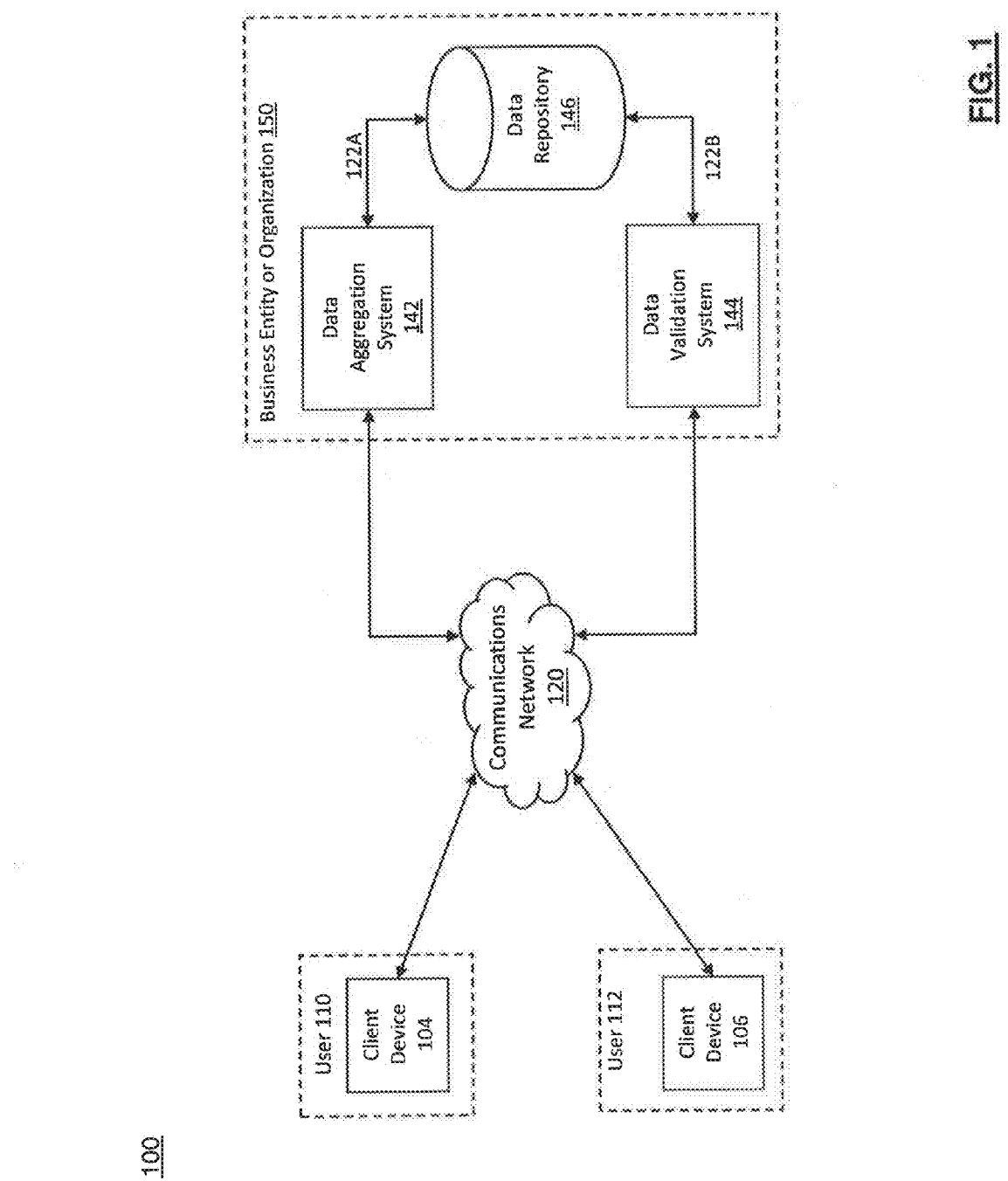
FIG. 1 is a diagram of an exemplary computing environment, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

I. Conventional Techniques for Capturing and Aggregating Data

Many organizations, such as finance and micro-finance institutions, governmental entities, non-governmental entities, research institutions, and regulatory bodies, collect, aggregate, and analyze data to quantify an impact of their activities upon individuals and business within various geographic regions. For example, many philanthropically-oriented micro-finance institutions (e.g., MFIs) may be motivated by a belief that access to financial services may be useful for people who are struggling to get out of poverty, and may seek evidence confirming that their interventions serve populations in genuine need, result in tangible improvements in the lives of these populations, and further, contribute to the personal and financial success of these populations. In many instances, however, significant logistical, financial, and methodological challenges block avenues by which these organizations obtain appropriate and reliable data that quantifies an impact of provided financial services on a particular population.

The logistical, financial, and methodological challenges faced by many of these organizations and philanthropically-oriented MFIs include, for example, a lack of cost-effective and accurate approaches for collecting baseline and follow-up data, difficulties in constructing a panel for statistical analysis, and a lack of a viable control mechanism for isolating the effects of intervention on the population. Further, research staffs of many organizations and philanthropically-oriented MFIs are often small relative to the size of their client bases, especially considering global dispersion of serviced populations, and often lack the resources for more comprehensive data collection within these serviced populations.

Further, in order to generate data suitable for subsequent statistical analyses, organization must establish and adhere to rigorous research standards, and the generated data must be subject to external validation to identify and mediate errors in the generated data. These errors may, in some instances, result from typographical errors introduced into the generated data by an individual conducting a survey (e.g., a surveyor), a misinterpretation of a survey query by the surveyor and/or a surveyed client, and additionally or alternatively, a falsification of all or a portion of the obtained consumption data by the surveyor.

In some instances, typographical errors may represent the most common source of errors within generated organizational data. For example, a typographical error may occur when a surveyor incorrectly records or omits a portion of a numerical response to a survey query (e.g., recording a value of 100 when the client responded with 1000 or ten). Additionally or alternatively, a typographical error may occur when a recorded or selected response lacks consistency with other responses by the surveyed client (e.g., a client states they have did attend primary school and the surveyor then mistakenly records or selects "schoolteacher" as the client's employment in a subsequent survey query).

Further, and as described above, errors in the obtained data may also result from a misinterpretation of one or more survey queries by the surveyor and additionally or alternatively, by a surveyed client. These misinterpretations may, in some aspects, result in obvious inconsistencies between recorded responses and/or improbable responses to common survey queries. For example, the surveyor may ask that a client estimate an amount of rice consumed by the client's household per week, but the client may response with an amount of rice consumed on a monthly basis. The surveyor may thus record the amount of consumed rice on a monthly basis, instead of dividing that monthly total by four, thus introducing a misinterpretation error that overstates the client's intake of rice by a factor of four.

In further instances, falsified data may represent a problematic and potentially degrading source of errors within the generated organizational data. For example, a surveyor may be motivated to falsify a response to a single survey query, a section or group of survey queries, and/or the responses associated with an entire survey. Although falsified data may be difficult to identify in isolation (e.g., when viewed together in the content of a client's responses to a corresponding survey), a comparison of the client's responses with responses obtained by other clients by the surveyor (or by other surveyors) may highlight patterns that identify the potentially falsified data.

Conventional techniques for data aggregation may, in some aspects, be inadequate to identify and mitigate errors in the generated organizational data, especially for portions of the data obtained through digital survey techniques consistent with the disclosed embodiments. For example, through these digital survey techniques, a device of a surveyor (e.g., a tablet computer) may obtain survey data and present successive survey inquiries to the surveyor through a corresponding graphical user interface (GUI). The surveyor may provide input to the GUI specifying a client's responses to the survey queries (e.g., as values input to a corresponding text box or field and/or as input provided to a scroll bar or other menu item), and upon completion of the survey, the surveyor's table device may provide data indicative of the received responses to a centralized data aggregator system, as described below.

While conventional data aggregation system may scan through the received responses and perform operations to generate simple reports, these systems alone are unable to identify and/or flag erroneous data, much less modify portions of the received data correct the identified and/or flagged errors. Further, although the surveyors' tablet devices may be capable of autonomously correcting simple and/or apparent data errors (e.g., data errors that result in an apparent inconsistency between input values), these tablet devices also provide no mechanism to contextually or statistically identify portions of inputted data that represent potential errors.

Further, although techniques may exist to identify data outliers (i.e., potentially erroneous data) within aggregated data, these techniques often discard the identified data outliers without any attempt to effect an appropriate correction. In certain aspects, the discarded data may reduce a numbered of surveyed clients within a particular panel, thus rendering the remaining data and corresponding clients less representative of the surveyed population geographic region (or portion thereof). Further, due to the reduction in surveyed clients, the remaining consumption data may be incapable of serving as a basis for further statistical analysis.

The disclosed embodiments address these and other deficiencies of conventional data analysis techniques in a technical manner. For example, the disclosed embodiments may provide a computer-implemented data management platform that includes a data aggregator system configured to receive data collected by one or more geographically-dispersed communications devices, and a data repository that stores the received data sets. Data management platforms consistent with the disclosed embodiments may also include data validation system coupled to the data repository and configured to analyze aggregated data to identify and flag potentially erroneous data elements (e.g., data outliers), enable a user device to highlight the data outliers for the survey manager's review, and modify portions of the aggregated survey response data in accordance with input received from the user device.

In some aspects, the disclosed embodiments, as implemented by components of an exemplary computing environment described below, may enable a correction or mitigation of potential errors within the aggregated survey data without reducing a number of data points, thus generating a "clean" data set suitable for future statistical analyses that support the missions of organizations, including philanthropically-oriented MFIs, such as FINCA™.

II. Exemplary Data Management Platforms and Computing Environments

FIG. 1 illustrates an exemplary computing environment 100 consistent with certain disclosed embodiments. In one aspect, computing environment 100 may include client devices 104 and 106, a data aggregation system 142, a data validation system 144, and a communications network 120 connecting one or more of the components of environment 100. Further, in some aspects, computing environment 100 may also include a data repository 146 in communication data aggregation system 142 and data validation system 144 across corresponding wired or wireless connections 122A and 122B. In other aspects, not depicted in FIG. 1, data aggregation system 142 and/or data validation system 144 (and additionally or alternatively, other devices of environment 100) may access and exchange data with data repository 146 across network 120 using any of the communications protocols outlined below.

a. Exemplary Computing Devices

In an embodiment, client devices 104 and 106 may be implemented as a processor-based system and/or a computer-based system. For example, client devices 104 and 106 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on a display device(s), consistent with disclosed embodiments.

In certain embodiments, client device 104 may be associated with one or more users, such as user 110, and client device 106 may be associated with one or more users, such as user 112. For instance, users 110 and 112 may operate corresponding ones of client devices 104 and 106, and may do so to cause client devices 104 and 106 to perform one or more operations consistent with the disclosed embodiments.

In certain aspects, client devices 104 and 106 may include one or more tangible, non-transitory memories that store data and/or software instructions, and one or more processors configured to execute software instructions. Client devices 104 and 106 may also include one or more display devices that display information to corresponding users (e.g., user 110 and 112), and one or more input device(s) to allow the corresponding users to input information to client device 104 (e.g., keypad, keyboard, touch screen, voice activated control technologies, or any other type of known input device).

In one aspect, client devices 104 and 106 may store in memory one or more software applications that, when executed by one or more processors, cause corresponding ones of client devices 104 and 106 to exchange data with components of environment 100 (e.g., data aggregation system 142 and/or data validation system 144) and perform operations consistent with the disclosed embodiments. In some instances, the one or more stored software applications may include one or more applications provided by a business entity or organization 150 (e.g., mobile apps) through a corresponding electronic commerce portal (e.g., iTunes™, Google Play™, etc.). In other instances, the one or more stored application may include browser plug-ins, widgets, and other application parts that, when executed in conjunction with a web browser, facilitate an exchange of data between client device 104 and 106 and components of environment 100 (e.g., through a web page rendered for display by client devices 104 and/or 106).

In one example, client device 104 may store one or more software applications in a memory that, upon execution by client device 104, cause client device 104 to obtain data from data aggregator system 142 (and additionally or alternatively, from data validation system 144), and to display the obtained portions of the data to user 110 through a corresponding graphical user interface (GUI). In other aspects, the one or more executed software applications may cause client device 104 to collect and store data input by user 110, and additionally or alternatively, other data identifying user 110 and/or a source of the data, which client device 104 may transmit to data aggregation system 142 at regular intervals or in response to input from user 110.

Further, and in some instances, client device 106 may also store one or more software applications in a memory that, upon execution by client device 106, cause client device 106 to perform operations to access one or more components of environment 100 and access, edit, and/or present to user 112 portions of aggregated data in accordance with appropriate data permissioning policies. In certain aspects, the portions of the aggregated data may include data outliers that represent potentially erroneous data (e.g., due to typographic errors, misrepresentation errors, falsified data, etc.). In some instances, the one or more executed software applications may cause client device 106 to obtain data identifying the data outliers and portions of aggregated data that include the data outliers (e.g., from data validation system 144), and process obtained data to visually highlight the data outliers within the portions of the aggregated data presented to user 112. In other instances, user 112 may provide, as input to client device 106, modifications to the aggregated data that address and/or mitigate the data outliers, which client device 106 may collect and transmit to data validation system 144, as described below.

In some instances, the aggregated data collected, accessed, presented, and/or edited by client devices 104 and/or 106 may include, but is not limited to, population- and/or region-specific survey data, enterprise data, customer data, purchase data, transaction data, financial data, employment data, geo-location data, and any additional or alternate data appropriate for review and analysis by business entity or organization 150. For example, and consistent with the disclosed embodiments, client device 104 may obtain data associated with at least one survey from data aggregator system 142 (and additionally or alternatively, from data validation system 144), present the obtained portions of the survey data (e.g., one or more sequentially ordered survey queries) to user 110 through a corresponding graphical user interface (GUI), and may receive, as input from user 110, data indicative of client responses to the survey, which client device 104 may transmit to data aggregation system 142 at regular intervals or in response to input from user 110. Further, by way of example, client device 106 to obtain and present to user 112 portions of aggregated data filtered in accordance with one or more user-specified criteria (e.g., geographic limitations, temporal limitations, etc.). In some instances, the one or more executed software applications may cause client device 106 to obtain information identifying the data outliers and portions of aggregated survey response data that include the data outliers, and process obtained data to visually highlight the data outliers within the portions of the aggregated survey response data presented to user 112, and receive input from user 112 identifying, modifications to the aggregated data that address and/or mitigate the data outliers, which client device 106 may collect and transmit to data validation system 144, as described below.

The disclosed embodiments are, however, not limited to the exemplary collected and aggregated data described above, including collected and aggregated survey data, and further aspects, client devices 104 and 106 may collected, accessed, present, and/or edit any additional or alternate data appropriate to users 110 and 112 and to the components of environment 100. Further, and in the embodiment of FIG. 1, environment 100 includes single client devices (e.g., client devices 104 and 106) associated with corresponding users (e.g. user 110 and 112). The disclosed embodiments are, however, not limited to these exemplary configurations, and in further embodiments, environment 100 may include any additional or alternate number of client devices 104 and 106 (e.g., table computers, smartphones, etc.) and any number of additional or alternate users.

b. Exemplary Computing Systems

Data aggregation system 142 and data validation system 144 may be implemented as computing systems configured to execute software instructions to perform one or more operations consistent with disclosed embodiments. In one aspect, data aggregation system 142 and data validation system 144 may be associated with a business entity or organization 150, which may include a not-for profit, philanthropically-oriented MFI 150 that provides financial services (e.g., access to credit, savings, insurance, etc.) to vulnerable and/or impoverished populations. The disclosed embodiments are, however, not limited to these exemplary business entities, and in additional embodiments, business entity or organization 150 may include, but is not limited to, a governmental entity, a non-governmental entity, a research entity, a stakeholder of business entity or organization 150, any additional or alternate entity that generates and analyzes aggregated data. Further, in some aspects, data aggregation system 142 and/or data validation system 144 may be distributed systems that may include computing components distributed across one or ore networks, such as network 120, or other networks.

In one aspect, data aggregation system 142 and data validation system 144 may include computing components configured to store, maintain, and generate data and software instructions. For example, data aggregation system 142 and additionally or alternatively, data validation system 144, may include one or more servers and tangible, non-transitory memory devices. In some instances, servers consistent with the disclosed embodiments may include one or more computing devices that may be configured to execute software instructions to perform one or more processes consistent with the disclosed embodiments.

In one embodiment, a server associated with data aggregation system 142 and/or data validation system 144 may include a computer (e.g., a server, personal computer, network computer, or mainframe computer) having one or more processors that may be selectively activated or reconfigured by a computer program. For example, a server (or other computing component) of data aggregation system 142 and/or data validation system 144 may be configured to provide one or more websites, digital portals, etc., that provide services consistent with disclosed embodiments. For instance, a server may be configured to provide information associated with a requested web page over communications network 120 to client devices 104 and/or 106, which may render the received information and present content from the web page on a display device, e.g., a touchscreen display unit.

In other aspects, a server (or other computing component) of data aggregation system 142 and/or data validation system 144 may be configured to provide information to one or more application programs executed by client devices 104 and 106 (e.g., through a corresponding application programming interface (API)). For example, client device 104 (or alternatively, client device 106) may execute an application program associated with and provided by business entity or organization 150. As described above, client device 104 and/or 106 may receive information from server or other computing components of aggregation system 142 and/or data validation system 144 (e.g., through the API associated with the executed application program), and may be configured by the executed application program to present portions of the information to users 110 and/or 112 through a corresponding graphical user interface (GUI).

In an embodiment, and as described below, one or more computing components of data aggregation system 142 may receive data collected by client device 104 (e.g., which may include, but is not limited to, data specifying responses to survey queries received from surveyed clients and input into client device 104 by user 110). Data aggregation server 142 may be further configured to receive additional information associated with the collected data, which may include, but is not limited to, information identifying a source of the data (e.g., a surveyed client, survey location, etc.), a collecting user (e.g., user 110), additional users (e.g., a supervisor of user 110), and a date and time of collection. In further aspects, data aggregation system 142 may transmit the received data and additionally or alternatively, the additional information, to data repository 146 across wired or wireless link 122A for storage and subsequent processing, as described below.

In further embodiments, one or more computing components of data validation system 144 may establish communications with data repository 146 (e.g., across wired or wireless link 122B), and may detect receipt and/or storage of the collected data associated with client device 104 and user 110 (and further, with other client device and users). In certain aspects, data validation system 144 may access the stored data (and additionally or alternatively, the corresponding metadata), and format the received data into a format appropriate to further statistical analysis (e.g., a comma-separate-value (CSV) format), associate the received data with user 110 and/or collection details (e.g., by generating metadata identifying user 110, other supervisory users (e.g., user 112), a time and date of collection or formatting, a data source, etc.), and aggregate the formatted data received from client device 104 with additional and previously received portions of data associated with other users or client devices.

In additional embodiments, data validation system 144 may normalize elements of the aggregated data and, further, may apply one or more statistical and/or contextual techniques to identify data outliers associated with elements of the normalized data that represent potential errors. One or more computing components of data validation system 144 may, in some aspects, generate additional metadata that not only identifies the data outliers, but also identifies additional characteristics of the outliers, such a user charged with inputting portions of the data that include the data outliers, supervisory users, dates, times, and/or locations of collection, etc. For instance, and in an event of a data outlier within survey data collected by user 110 and input into client device 104, the additional metadata may identify the particular survey query or queries associated with the data outliers, as well as the surveyor (e.g., user 110) and survey manager (e.g., user 112) responsible for the survey response data that includes data outliers.

Based on the generated metadata, one or more computing components of data validation system 144 may identify instances of potentially erroneous data (i.e., the data outliers) attributable to or collected by particular users (e.g., user 110) and/or associated with and supervised by corresponding users (e.g., user 112), and may generate and transmit messages to the corresponding users that identify the data outliers within the aggregated data, and further, provide the corresponding users with an opportunity to propose modifications to the aggregated data (e.g., though client device 106) that mediate the potential errors. One or more components of data validation system 144 may receive the proposed modifications from client device 106, may modify portions of the aggregated data stored within data repository 146 to effect the proposed modifications and further, may generate additional metadata that identifies the effected modifications and the sources of the effected modifications to generate an audit trail for the aggregated data.

c. Exemplary Centralized Data Repositories and Stored Data

Data repository 146 may include one or more memories that are configured to store and provide access to data and/or software instructions. Such memories may include tangible non-transitory computer-readable media that store software instructions that, when executed by one or more processors (e.g., of server 132), perform one or more operations consistent with disclosed embodiments.

Data repository 146 may also be configured to store information relating to business entity or organization 150. As described above, business entity or organization 150 may include, but is not limited to, a governmental entity, a non-governmental entity, a research entity, a stakeholder of business entity or organization 150, any additional or alternate entity that generates and analyzes aggregated data. In some aspects, data repository 144 may be configured to store data identifying users, customers, and/or clients of business entity or organization 150, raw and/or aggregated data received from these users, customers, and/or clients, access and/or editing permissions assigned to these users, customers, and/or clients, and/or authentication credentials that enable these users, customers, and/or clients to access data aggregation system 142 and/or data validation system 144.

In one aspect, data repository 144 may store data that uniquely identifies one or more of users 110 and 112, and further, supervisory relationships between users 110 and 112 (e.g., data identifying that user 112 supervises user 110's collection of data). By way of example, client device 104 may access data aggregation system 142 (e.g., through a web server executed by a corresponding front end or through an application programming interface (API)), and may provide corresponding authentication credentials of user 110 to transmit portions of collected data (e.g., survey data) to data aggregation system 142. Further, for example, client device 106 of user 112 (and additionally or alternatively, client device 104 of user 110) may a web page a web page associated with data validation system 144 (e.g., through a web server executed by a corresponding front end), and may provide corresponding authentication credentials of user 112 in an effort to access and propose modifications to potentially erroneous elements of previously aggregated and stored data (e.g., as collected by client device 104 and provided to data aggregation system 142).

In some embodiments, data repository 146 may be configured to store personal data and authentication credentials associated with authorized users (e.g., user 110 and 112) and other representatives of business entity or organization 150. Authentication credentials consistent with the disclosed embodiments may include, but are not limited to, a user name, a user-specified password, a system-generated password, an alphanumeric identification number (e.g., a PIN number) assigned by business entity or organization 150 and/or specified by users 110 and/or 112, and information facilitating enhanced authentication techniques, such as biometric data.

Data repository 146 may also be configured to store data specifying access permissions associated with users 110 and/or 112. For instance, access permissioning data consistent with the disclosed embodiments may specify one or more sets of data that are accessible to user 110 (e.g., by storing a data structure that associated particular data identifiers with user 110). In additional aspects, the stored access permissioning data may identify one or more users (e.g., user 110) that operate under the supervision of a manager (e.g., user 112) and thus, may grant user 112 access to data collected and provided to data aggregation system 142 by client device 104 of user 110, in accordance with disclosed embodiments.

Further, in additional embodiments, data repository 146 may be configured to store aggregated data collected by various users (e.g., user 110) and provided to data aggregation system 142 by corresponding client devices. For example, and as described above, the collected data may include, but is not limited to, survey response data collected by surveyors (e.g., user 110) from panels of client dispersed throughout the various geographic regions served by business entity or organization 150 (e.g., a philanthropically-oriented micro-finance institution, a research entity, a governmental entity, stakeholders thereof, etc.).

In additional examples, and in support of these survey processes, data repository 150 may store data associated with surveys conducted on behalf of business entity or organization 150 by various geographically dispersed surveyors under supervision of corresponding survey managers. For example, data repository 146 may be configured to store, in corresponding data structures, information identifying one or more previously established surveys, data and metadata (e.g., HTML code) facilitating a rendering and presentation of survey material by mobile communications devices of surveyors, and further, information identifying surveyors and/or survey managers authorized to access portions of the stored data.

In some embodiments, data repository 146 may be configured to store metadata generated by data validation system 144 that identifies elements of potentially erroneous data within aggregated data sets, and further, associates the elements of potentially erroneous data with particular surveyors, survey managers, and conducted surveys (e.g., surveyed clients and survey location). Further, data repository 146 may be configured to store corrected sets of aggregated data (e.g., that incorporate modifications to particular data elements by data validation system 144 in accordance with proposals from user 112) in conjunction with additional metadata identifying each modification to elements of particular corrected data set and a user that proposed the change, in additional to prior values of these data elements. The corrected sets of survey response data may, in some aspects, be suitable for future statistical analyses (e.g., analyses by business entity or organization 150 to asses an impact of interventions within a particular geographic region on temporal variations in levels of impoverishment). In further aspects, the metadata maintained by data repository 146 may establish an audit trail that enables business entity or organization 150 and additionally or alternatively, one or more third parties or auditors, to trace an evolution of the particular data element from capture by a user through modifications by a manager.

d. Exemplary Communications Networks

Communications network 120 may include one or ore communication networks or medium of digital data communication. Examples of communication network 120 include a local area network ("LAN"), a wireless LAN, a RF network, a Near Field Communication (NFC) network, (e.g., a "WiFi" network), a wireless Metropolitan Area Network (MAN) connecting multiple wireless LANs, NFC communication link(s), and a wide area network ("WAN"), e.g., the Internet. Consistent with embodiments of the present disclosure, communications network 120 may include the Internet and any publicly accessible network or networks interconnected via one or more communication protocols, including, but not limited to, hypertext transfer protocol (HTTP) and transmission control protocol/internet protocol (TCP/IP). Communications protocols consistent with the disclosed embodiments also include protocols facilitating data transfer using radio frequency identification (RFID) communications and/or NFC. Moreover, communications network 120 may also include one or more mobile device networks, such as a GSM network or a PCS network, allowing client device 104 to send and receive data via applicable communications protocols, including those described herein. Further, wired and/or wireless connections 122A and 122B may include any of the communications networks or mechanisms for digital data communication outlined above, including those that facilitate communications between data aggregation system 142, data validation system 144, and data repository 146 across a private communications network associated with business entity or organization 150.

III. Exemplary Processes for Adaptively Identifying and Correcting Data Errors in Aggregated Data As described above, the disclosed embodiments may provide a technical solution that addresses one or more of the above deficiencies apparent in conventional data analysis and aggregation techniques, especially when used in conjunction with digital collection methodologies to identify potentially erroneous portions of collected digital survey data. For example, the disclosed embodiments may provide a computer-implemented data management platform that couples a data aggregation system (e.g., data aggregation system 142 of FIG. 1), which may function as a conduit to receives and aggregate survey data collected by various mobile collection devices (e.g., client device 104), to a data validation system (e.g., data validation system 144 of FIG. 1) that identifies and facilitates correction of potential outliers within the collected aggregated data based on feedback received from devices of users (e.g., client device 106 of FIG. 1) responsible for the collected data.

By way of example, business entity or organization 150 may provide financial services to underserved, impoverished populations (e.g., clients) throughout the world. In certain aspects, and consistent with its mission to improve the lives of client populations and reduce levels of impoverishment, business entity or organization 150 may develop region- and/or population-specific surveys having sequential queries design to provide, to business entity or organization 150, response data that may quantify an impact of business entity or organization 150's intervention within the client populations, either directly or through additional statistical analyses of the resulting responses.

In one aspect, one or more computing systems associated with business entity or organization 150 may execute stored software instructions to establish form data specifying the individual queries of the region- and/or population-specific surveys and the specifies particular data types associated with appropriate responses to the individual queries. The particular data types may include, but are not limited to, numerical data, such as continuous digits and integers, and categorical data, such as a number of predetermined options (e.g., baker, farmer, teacher, etc., as responses to an inquiry regarding a client's employment), true or false, and a range of numbers (e.g., between zero and ten, etc.). The one or more computing systems may, in further aspects, establish additional information that instructs a device of a surveyor (e.g., client device 104) to present the queries in sequential order and to facilitate the surveyor's entry of appropriate client responses (e.g., within a text box, as a pull-down menu, by selecting an icon, etc.).

For example, a device associated held by a representative of business entity or organization 150 may execute a software application that enables the representative to interactively generate the form and presentation data for the region- and/or population-specific surveys in a device-specific or device-agnostic format. The software application executed by the representative's device may also transmit the generated form and presentation data for the region- and/or population-specific surveys to data repository 146, which may store the form and presentation data for the surveys.

Further, and by way of example, the representative of business entity or organization 150 (e.g., through the representative's device) may establish a survey panel that includes a statistically significant selection of clients (e.g., individuals, households, and/or entities) disposed within a geographic region or a particular population served by business entity or organization 150. In some instances, the representative may assign the established survey panel to a corresponding survey manager (e.g., user 112), who may assign one or more surveyors (e.g., user 110) to conduct surveys of the selected clients, and who may supervise the training and actions of these assigned surveyors. In further instances, user 112 may, through client device 106, generate information that identifies the individual surveyors assigned to the selected clients and thus, associated with a region- or population-specific survey appropriate to these selected clients. In one aspect, client device 106 may be configured to transmit the generated assignment data to data aggregation server 142 (and/or data validation system 144), which may store the assignment data in a corresponding portion of data repository 144. The disclosed embodiments are, however, not limited to the exemplary assignment data outlined above, and in other embodiments, the device held by the representative of business entity or organization 150 and any additional or alternate component of environment 100 may generate data associating corresponding ones of the generated surveys with the surveyors and further, data associating a subset of the surveyors with corresponding survey managers.

In some instances, and consistent with the above examples, user 110 may be assigned to query a selected client and obtain responses to queries within an appropriate one of the region- or population-specific surveys. For example, and through a corresponding device (e.g., client device 104), user 110 may access data aggregation system 142 and/or data validation system 144 (e.g., through a web server executed by a corresponding front end and/or through a request passed through an appropriate application programming interface (API)) and obtain form and presentation data that establishes the appropriate survey. Client device 104 may, upon execution of one or more stored application programs, generate a graphical user interface (GUI) that sequentially presents each query established for the appropriate survey. Upon receipt of a response from the selected client, user 110 may provide the received response as input to client device 104 (e.g., numerical data entered into a corresponding text box and/or categorical data associated with a selected interface element or menu), and client device 104 may link the inputted response to the corresponding query, and collect the inputted and linked responses for storage within a corresponding data structure or a locally accessible memory.

Upon completion of the survey, the collected response data may include data records that include responses to each of the established queries and data linking the responses to the corresponding queries. The collected response data may also include data identifying user 110, the surveyed client, and further, information specifying details of the survey, such as time, date, and/or location. In some aspects, user device 104 may transmit the response data associated with the completed survey to data aggregation system 142, which may store the response data in a portion of data repository 146 for subsequent processing and analysis, e.g., by data validation system 144. For example, client device 104 may transmit the response data to data aggregation system 142 in response to instructions received from user 110 (e.g., upon accessing a drop box or FTP site associated with data aggregation system 142), or automatically without intervention from user 110, e.g., a predetermined and/or regular times and dates. Data aggregation system 142 may, in some instances, be configured to store the response data within a portion of data repository 146, along with metadata identifying sources of the portion of the survey response data (e.g., client device 104 of user 110), dates and/or times of submission to data aggregation system 142, and further, client identifiers and survey locations.

In an embodiment, data validation system 144 may be configured to identify newly stored response data (e.g., by data aggregation system 142 in data repository 144), to reformat and normalize the response data, and to perform statistical and contextual analyses of the identified response data and detect outliers within the aggregated survey response data that could represent occurrences of erroneous data. As described below in reference to FIG. 2, data validation system may collect instances of outliers among response data received from surveyors (e.g., user 110) under the supervision of a corresponding survey manager (e.g., user 112), may transmit messages identifying the detected outliers within the survey response data to a device of the corresponding survey manager (e.g., client device 106), and to modify at least a portion of the stored aggregated response data in accordance with a response to the transmitted message from user 112.

The modified survey response data, as maintained by data repository 146, may be free from outliers and other potentially erroneous data, and may include responses from a statistically significant panel of clients within a corresponding geographic region or population. The resulting "clean" survey response data may thus be suitable for additional statistical analyses that enable business entity or organization 150 to assess an impact of their intervention within the geographic region or panel over time.

Further, and although described above in terms of exemplary survey data collected, aggregated, analyzed, and modified by various components of computing environment 100, the disclosed embodiments are not limited to these or any other exemplary types of data. In other aspects, data collected, aggregated, analyzed, and/or modified by the disclosed embodiments may include, but is not limited to, enterprise data, customer data, purchase data, transaction data, financial data, employment data, geo-location data, and any additional or alternate data appropriate for review and analysis by business entity or organization 150.

Figure 2:
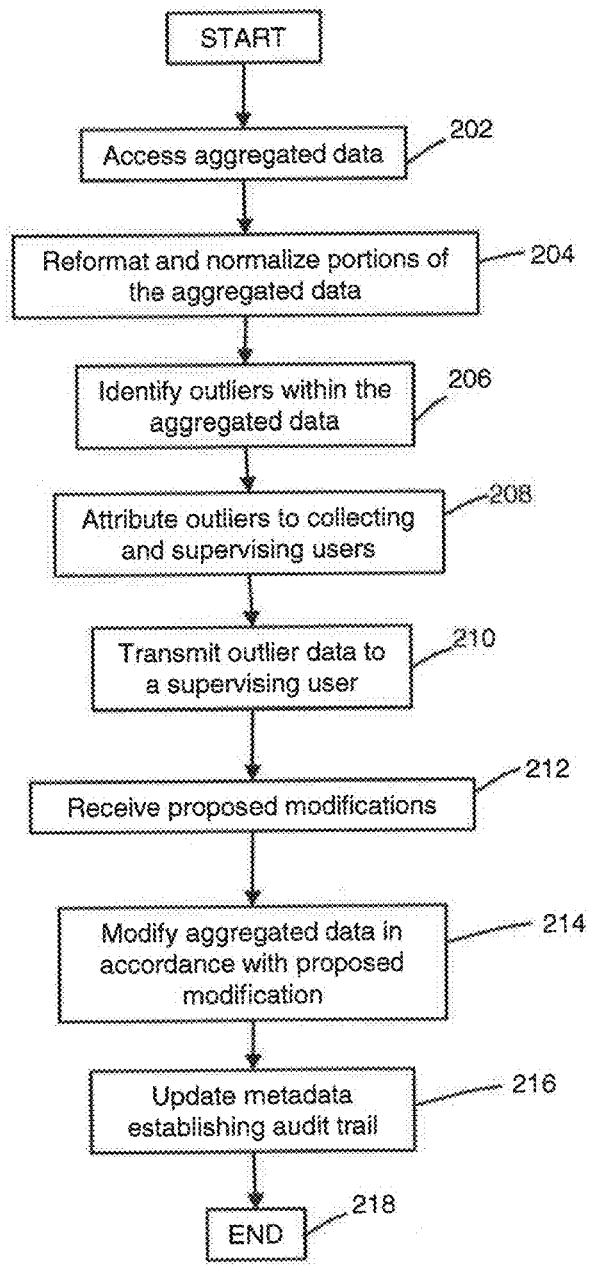
FIG. 2 is a flowchart of an exemplary process for identifying and correcting potential errors within collected survey response data, consistent with the disclosed embodiments.

FIG. 2 is a flowchart of an exemplary process 200 for identifying and mitigating statistical in aggregated data, in accordance with disclosed embodiments. In an embodiment, a data aggregation system (e.g., data aggregation system 142 of FIG. 1) may receive data collected by one or more client devices (e.g., client device 104 of user 110), and may aggregate and store the received data within a portion of a data repository (e.g., data repository 146 of FIG. 1). A data validation system (e.g., data validation system 144 of FIG. 1) may access the aggregated data, may reformat and normalize portions of the aggregated data, and further, may identify outliers within the normalized data that, in some aspects, could represent potential errors. In certain aspects, data validation system 144 may collect a subset of the identified outliers linked to data collected by a particular user (e.g., user 110) and supervised by a particular manager (e.g., user 112), and may transmit a message to a device of user 112 (e.g., client device 106) that, upon presentation by client device 106, enables user 112 to visually perceive the outliers within the corresponding data and provide confirmation and/or appropriate correction. Upon receipt of a response for client device 106, which may include a proposed correction, data validation system 144 may effect a modification to at least a portion of the accessed aggregated data in accordance with user 110's proposal.

Referring to FIG. 2, data validation system 144 may be configured to access at least a portion of aggregated data stored within data repository 146 (e.g., ire step 202). For example, the accessed data may include survey response data collected by one or more survey devices, including client device 104 of user 110, and may include data records that specify responses to one or more survey queries collected by the survey devices from corresponding clients within an established statistical panel. Further, and as described above, the data records may be associated with one or more corresponding surveyors (e.g., user 110), which may be supervised by one or more survey managers (e.g., user 112). The disclosed embodiments are, however, not limited to exemplary survey data, and in other embodiments, the aggregated data may include, but is not limited to, enterprise data, customer data, purchase data, transaction data, financial data, employment data, geo-location data, and any additional or alternate data appropriate for review and analysis by business entity or organization 150.

In some aspects, data validation system 144 may perform operations that reformat and normalize at least a portion of the accessed data based on one or more corresponding normalization rules (e.g., in step 204). For example, in step 204, data validation system 144 may re-format the accessed data into a format appropriate for further analyses, as described below. For example, data validation system 144 may process and format the accessed data in a comma-separated-value (CSV) format. The disclosed embodiments are, however, not limited to these exemplary formats, and in other aspects, data validation system 144 may format the collected response in any additional or alternate data format appropriate to the collected response data, data validation system 144, and/or data repository 146.

Further, and as described above, the accessed data may include data having numerical formats (e.g., a response to a query regarding a client's monthly rice consumption) and/or categorical formats (e.g., in response to a query regarding a client's occupation). In certain instances, data validation system 144 may identify that portion of the accessed data having a numerical data format in step 204, and may further, obtain one or more rules (e.g., from as stored within data repository 146) that specify a process for normalizing the identified portion of the accessed data. In certain some examples, one or more of the normalization rules may be linked to corresponding survey queries, and as described above, the representative of business entity or organization 150 may establish one or more of the normalization rules upon specification of the corresponding survey queries.

By way of example, the identified portions of accessed data may include responses to survey queries that include, but are not limited to, a number of occupants in a corresponding household and a monthly rice intake (in kilograms) of that household. For instance, within the accessed data, a first data record may specify that a first client household includes four occupants and consumes two kilograms of rice per month, and a second data record may specify that a second client household includes eight occupants and consumes three kilograms of rice on a monthly basis. In some aspects, data validation system 144 may access a normalization rule that specifies a total monthly household consumption of rice (in grams) be normalized in accordance with a total number of household occupants.

In some aspects, in step 204, data validation system 144 may normalize the total monthly rice consumption of the first and second client households to determine that, on a monthly basis, the first client household consumes 500 grams of rice per occupant, and the second client household consumes 375 grams of rice per occupant. Thus, the normalized rice consumption indicates that, on a per occupant basis, the first client household consumes more rice that the second household. The disclosed embodiments are, however, not limited to these exemplary normalization processes and normalization rules, and in further embodiments, business entity or organization 150 may establish any additional or alternate normalization rules appropriate to the data.

Data validation system 144 may, in additional aspects, process the accessed data, which includes the normalized numerical data and the raw categorical data, to identify one or more elements of the data that are different from other elements of the data and thus, represent outliers (e.g., in step 206). In certain aspects, the identification of an element of data as an outlier may not necessarily imply that the data element represents an error in the accessed data. The identification of the data element as an outlier instead implies that a numerical or categorical value associated with the data element is unusual when compared to other comparable data elements (e.g., values of responses to the same survey query, as described above).

Further, and as described above, the processed data may include normalized numerical data and raw categorical data, which may not be normalized. In some aspects, and as described below, data validation system 144 may tailor the statistical and contextual techniques applied to the data in step 206 based on a corresponding data type, and data validation system 144 may apply one or more statistical and contextual techniques to identify outliers in the normalized numerical data, and additional and different statistical techniques to identify outliers within the raw categorical data.

In one aspect, to identify outliers in normalized numerical data in step 206, data validation system 144 may apply an interquartile outlier check to portions of the normalized numerical data. For instance, data validation system 144 may establish a portion of the normalized numerical data corresponding to a particular survey query (e.g., related to a monthly rice intake) as a data set for outlier analysis, and may compute an interquartile range that falls between the $25^{th}$ and $75^{th}$ percentiles of the established data set. Data validation system 144 may in some instances, multiple the interquartile range by a predetermined factor (e.g., two or three), and identify elements of the established data set as outliers when corresponding values exceed a sum of the multiplied interquartile range and the $75^{th}$ percentile, or alternatively, fall below a difference between the multiplied interquartile range and the $25^{th}$ percentile.

In further aspects, data validation system 144 may identify outliers in step 206 based on relationships of normalized data values to corresponding standard deviations. For example, and as described above, data validation system 144 may establish a portion of the normalized numerical data corresponding to a particular survey query (e.g., related to a monthly rice intake) as a data set for outlier analysis, may compute a standard deviation, a mean value, and a median value of the established data set. In one embodiments, data validation system 144 identify an element of the established data set as an outlier when a magnitude of a difference between the mean value and its corresponding value exceeds a product of the standard deviation and a corresponding multiple (e.g., two or three). In other embodiments, the outlier analysis may be based on the computed median value, and data validation system 144 identify an element of the established data set as an outlier when a magnitude of a difference between the median value and its corresponding value exceeds a product of the standard deviation and a corresponding multiple (e.g., two or three). In certain aspects, the identification of outliers based on median values, and not mean values, may produce more robust results as the median value may be less resistant to outlier bias.

In other aspects, in step 206, data validation system 144 may identify outliers within normalized numerical data based on a linear regression analysis of sets of the normalized numerical data. As described above, data validation system 144 may establish a portion of the normalized numerical data corresponding to a particular survey query (e.g., related to a monthly rice intake) as a data set for outlier analysis. Data validation system 144 may, in step 206, perform a linear regression analysis of the established data set, which fits a simple regression line through the data values of the established data sets and determines a regularization interval about the simple regression line. In certain aspects, data validation system 144 identify an element of the established data set as an outlier when its corresponding value falls outside the regularization interval established about the simple regression line.

In further embodiments, and as described above, the processed survey response data may also include raw categorical data, which may not be normalized using the exemplary processes described above. For example, categorical data consistent with the disclosed embodiments may include, but is not limited to, responses to survey inquiries that are unrelated to a single continuous digit or integer, and instead represent arbitrary non-numerical values and/or ranges of numerical values (e.g., response to a query regarding a client's gender and/or employment).

In one aspect, in step 206, data validation system 144 may identify outliers within categorical data based on a consistency between successive or subsequent categorical data elements. For example, a first categorical response to a query within a given survey indicates that a client had no formal schooling, while a second categorical response to another query affirms the client's full literacy. In certain instances, data validation server 144 may determine that a low probability that the first and second categorical responses are mutually consistent, and may identify the first and second categorical responses as outliers in step 206.

In other aspects, data validation system 144 may identify outliers in categorical data based on an outcome of an average conditional probability analysis. For example, data validation system 144 may perform the average conditional probability analysis on the categorical response data to determine that a probability that a categorical response to a particular survey query will occur in conjunction with categorical responses to other survey queries. The outcome of the average conditional probability analysis for the categorical response to the particular survey query ranges from zero (no probability) to unity (100% probability), and data validation system 144 may establish the categorical response to the particular survey query as an outlier in step 206 when the outcome falls below a threshold value (e.g., 0.5, 0.1, 0.05, etc.) established by business entity or organization 150.

Further, in additional embodiments, and in step 206, data validation system may apply one or more additional statistical techniques to identify potentially falsified portions of the aggregated data. For example, and as described above, a particular surveyor may falsify a response to a single survey query, a subset of survey queries, and additionally or alternatively, all survey queries associated with a particular survey. In some aspects, data validation system 144 may be configured to partition survey response data into portions collected by various surveyors, and may perform a separation analysis on each portion of the survey response data to determine a likelihood that a corresponding one of the surveyors (e.g., user 110) falsified all or a part of the portion of the survey response data.

In one aspect, a separation analysis, when applied to a portion of the survey response data attributable to a corresponding surveyor, may output a numerical value (e.g., a "separation rate") ranging from zero to unity (or from zero to 100%) that indicates a degree to which the user 110's data behaves differently from survey response data attributable to other surveyors. For example, as illustrated in FIG. 3A, a separation rate near zero would indicate that little variation exists between the survey response data attributable to user 110 and the other surveyors. Thus, data validation system 144 may deem the data "non-separable" in step 206, and a minimal probability exists that user 110 falsified portions of the survey response data.

Figure 3B:
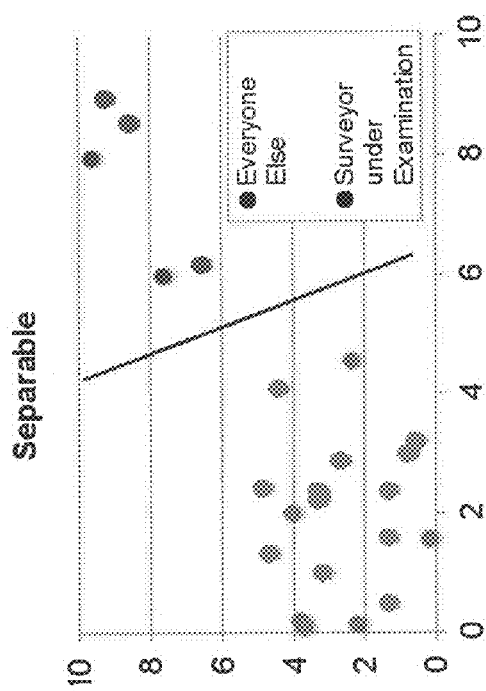
FIGS. 3A and 3B illustrate examples of separable and non-separable data, consistent with the disclosed embodiments.
Figure 3A:
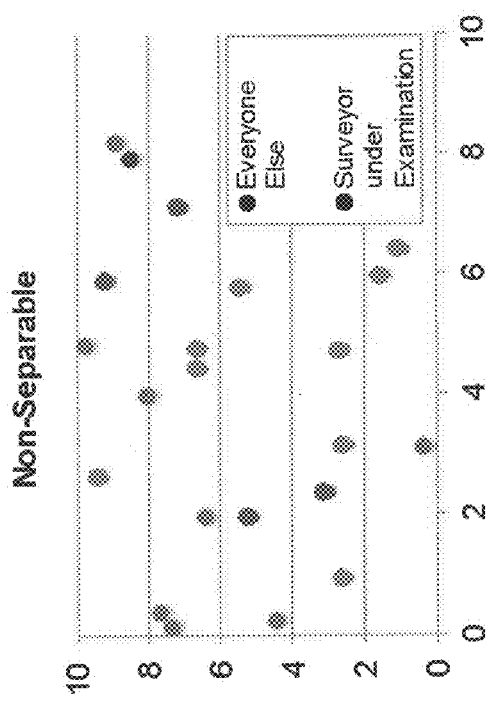

Alternatively, as illustrated in FIG. 3B, a separation rate near unity (or 100%) would indicate a substantial variation between the survey response data attributable to user 110 and the other surveyors. Thus, the data may be "separable," and a substantial probability exists that user 110 falsified portions of the survey response data. In certain aspects, in step 206, data validation system 144 may determine that data attributable to user 110 may be potentially falsified, and thus may be outliers, when the separation rate exceeds a threshold value (e.g., 75%, 85%, 95%, etc.) established by business entity or organization 150.

In the embodiments described above, data validation system 144 may identify outliers in step 206 based on an application of various statistical and contextual techniques to normalized numerical data and raw categorical data. The disclosed embodiments are, however, not limited to these exemplary techniques, and in further embodiments, data validation system 144 may apply any additional or alternate statistical or contextual technique to identify outliers within data sets that include numerical and/or categorical data (e.g., numerical and categorical responses to particular survey queries within portions of aggregated survey response data.

Referring back to FIG. 2, in step 208, data validation system 144 may perform operations that sort the identified outliers based on an attribution to particular users. For example, in step 208, data validation system 144 may identify data outliers collected by user 110 (e.g., acting as a corresponding surveyor) and/or under the supervision or management of user 112 (e.g., as a corresponding survey manager). In some aspects, data validation system 144 may generate metadata and/or modify existing metadata associated with the aggregated data (e.g., established to form an audit train) to include information that specifies the identified data outliers and user 110 and/or 112. By way of example, and for exemplary survey response data, data validation server 144 may generate and/or modify metadata to include the data-outlier information, identifiers of the particular surveys and/or survey questions associated with the identified outliers, and further, information identifying the corresponding surveyor and/or survey manager. In additional aspects, data validation system 144 may also include, within the metadata, information specifying a particular validation error associated with the outlier (e.g., a failure of an interquartile range (IQR) analysis, a failure of a standard deviation analysis, etc.).

In one aspect, data validation system 144 may generate and transmit messages to managers and/or supervisors of the data collection process (e.g., user 112, which may supervise the data collection of user 110) identifying not only the data outliers within the aggregated data, but also the validation errors associated with these outliers and information facilitating access to the data outliers within the stored aggregated data (e.g., in step 210). Data validation system 144 may, in step 210, transmit the generated message data to a device of user 112 (e.g., client device 106), which may receive and render the message data for presentation within corresponding graphical user interfaces (e.g., associated with executed client software applications provided by business entity or organization 150).

In one example, and as described above, the aggregated data may include aggregated survey response data collected by user 110, and data validation system 144 may transmit a message to user 112 (e.g., as survey manager) identifying not only one or more completed surveys that require validation, but also one or more surveys associated with the identified outliers. For example, data validation system 144 may generate message data that identifies one or more completed surveys supervised by user 112 and requiring confirmation or rejection. Further, and as described above, data validation system 144 may also include within the message data information identifying outliers within corresponding ones of the completed surveys. For example, the outlier information within the generated message data may include, but is not limited to, an identifier of a particular data field or survey query associated with at least one of the outliers, and further, information identifying a particular validation error associated with the outlier.

Figure 4A:
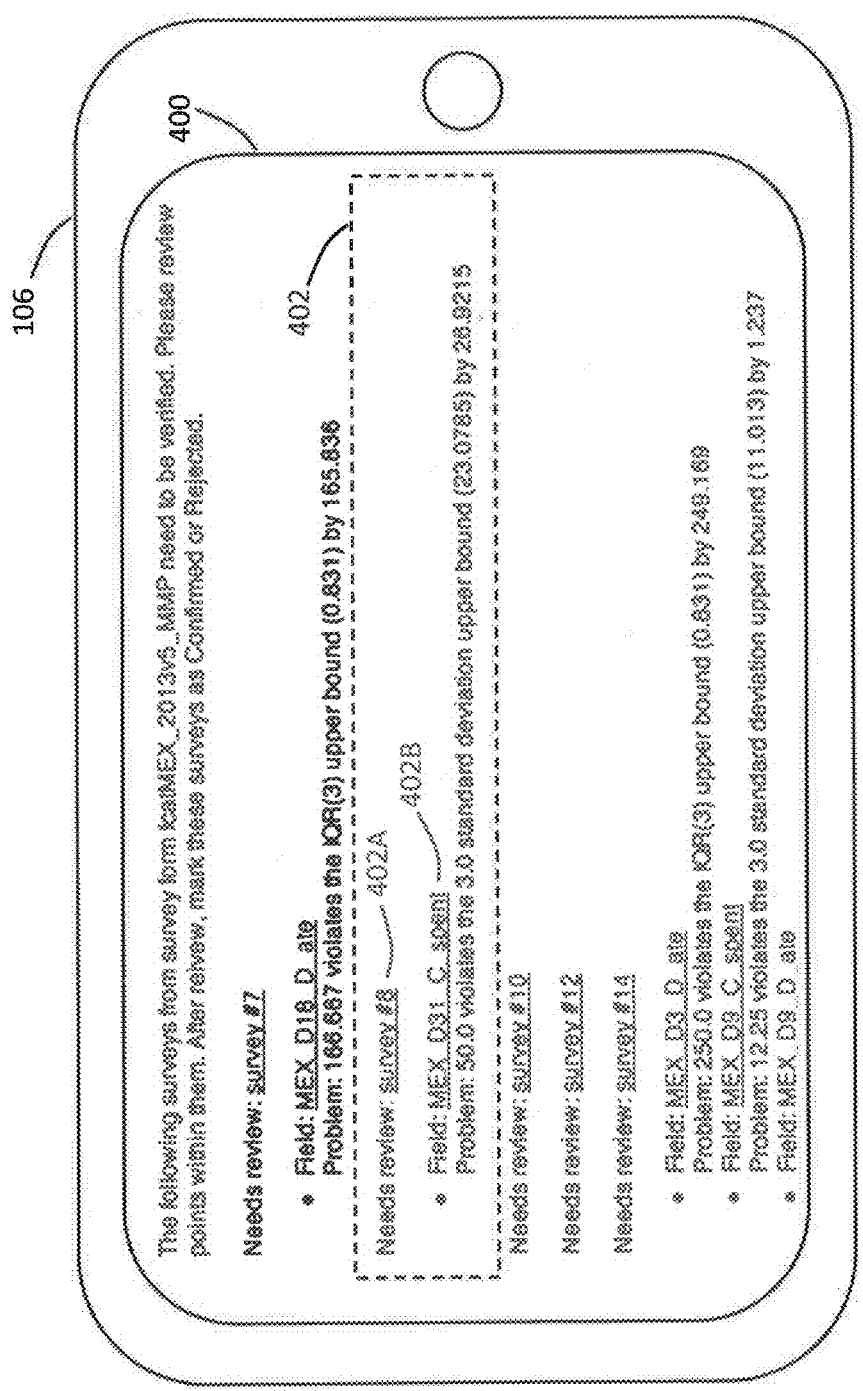
FIGS. 4A, 4B, and 4C are diagrams of exemplary graphical user interfaces, consistent with the disclosed embodiments.

For example, as illustrated in FIG. 4A, client device 106 of user 112 may receive the message data generated and transmitted by data validation system 144, and may render the generated message data for presentation with a corresponding graphical user interface (GUI) 400. As described above, GUI 400 may be generated by a client application program provided by business entity or organization 150 (e.g., and available through a corresponding electronic commerce portal, such as iTunes™ and Google Play™). The disclosed embodiments are, however, not limited to processes that display generated message data within a GUI of an executed client-side application, and in other embodiments, client device 106 may present the message data within a pop-up window, a portion of a web page provided by data validation system 144, and any additional or alternate interface appropriate to the message data and client device 106. In still other aspects, data validation system 144 may provide the message data to user 112 as an email message, text message, and/or in accordance with additional or alternate messaging protocols, such as those associated with social networking systems.

In FIG. 4A, GUI 400 may identify one or more surveys completed under the supervision of user 112 and further, which now require confirmation or rejection by user 112. Further, GUI 400 may also present, to user 112, information identifying one or more outliers detected within corresponding ones of the surveys (e.g., as identified by data validation system 144 in step 206, above), along with information identifying a corresponding survey inquiry that gave rise to the outlier (e.g., an identifier of a data field under which client device 104 recorded an input response) and further, information identifying a particular validation error associated with the outliers.

For example, for "survey #8," data 402 within GUI 400 identifies the corresponding survey requiring confirmation and/or rejection and provides a hyperlink 402A that, upon selection by user 112 (e.g., by clicking on hyperlink 402A, by tapping hyperlink 402A, or by providing other appropriate input to client device 106), causes client device 106 to present additional data in GUI 400 that enables user 112 to confirm or reject the results of "survey #8."

Further, data 402 also indicates that data validation system 144 identified an outlier within the aggregated survey response data associated with "survey #8." For example, data 402 specifies that the outlier corresponds to a response recorded under the "MEX_D31_C_spent" survey query identifier, and further, and that a normalized data value associated with the "MEX_D31_C_spent" identifier (e.g., a value of "50") exceeds an upper standard-deviation bound established for appropriate response data (e.g., that the normalized value exceeds the upper bound of 23.0785 by 26.9215). Accordingly, in some aspects, data 402 enables user 112 to not only identify a presence of an outlier within response data associated with certain surveys, but to determine a degree to which the outlier differs from comparable response data recorded by other surveyors.

Additionally, data 402 also provides hyperlink 402B that, upon selection by user 112, causes client device 106 to obtain and present additional survey response data within GUI 400 in a manner that visually distinguishes the data outlier (or data outliers) from other acceptable survey response data and enables user 112 to readily perceive the outlier within the survey response data. Further, in additional aspects, and in response to a selection of hyperlink 402B, client device 106 may obtain additional data from data validations server 144 that, upon presentation to user 112, enables user 112 to provide input to client device 106 that process a modification to a normalized or raw data value to mediate an identified outlier in corresponding survey response data.

Figure 4B:
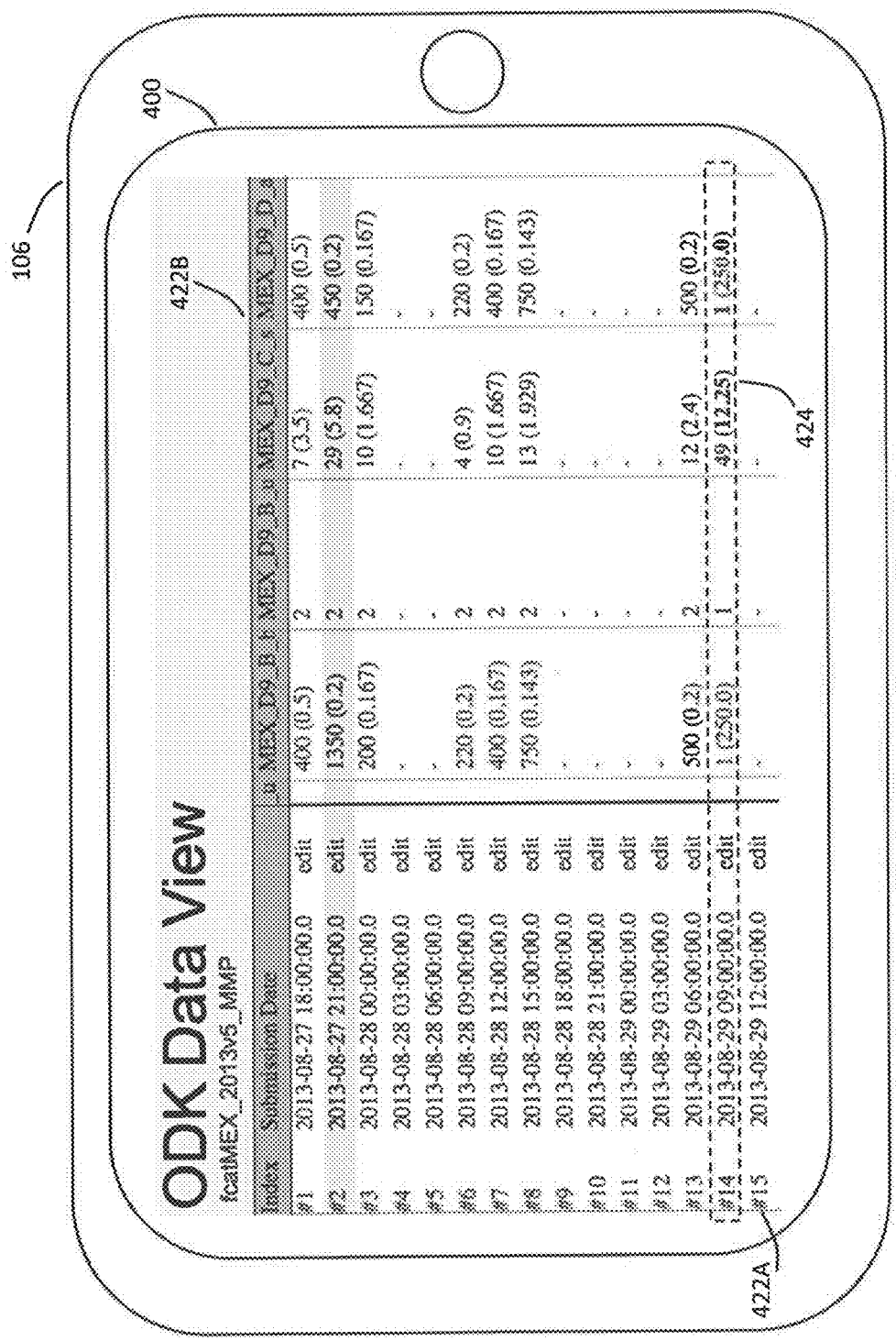

For example, in FIG. 4B, GUI 400 presents data to user 112 that identifies portions of aggregated response data associated with a particular set of survey queries (e.g., those included within survey "fcatMEX_2013v5_MMP"). As illustrated in FIG. 4B, the presented data identifies portions of the response submitted to data aggregation system 142 by devices of fifteen individual surveyors (e.g., survey indices 422A), and for each of query identifiers 422B, the presented data include both raw response values (e.g., without parentheses) and normalized response values (e.g., in parentheses).

As further illustrated in FIG. 4B, data 424 indicates that data validation system 144 identified outliers within response data submitted by the fourteenth surveyor for query identifiers "MEX_D9_D_ate" and "MEX_D9_C_spent." In some aspects, the additional data received from data validation system 144 may cause client device 106 to modify a visual presentation of the identified outliers to enable user 112 to identify the outliers and readily distinguish these outliers from other response data. For example, client device 106 may present data associated with these outliers in bold and/or italic font, in a color (e.g., red) that differs from a color of the response data that falls within acceptable bounds (e.g., black), or by introducing any additional or alternate visual, audible, and/or tactile effect perceptible by user 112 and appropriate to GUI 400 and/or client device 106.

Figure 4C:
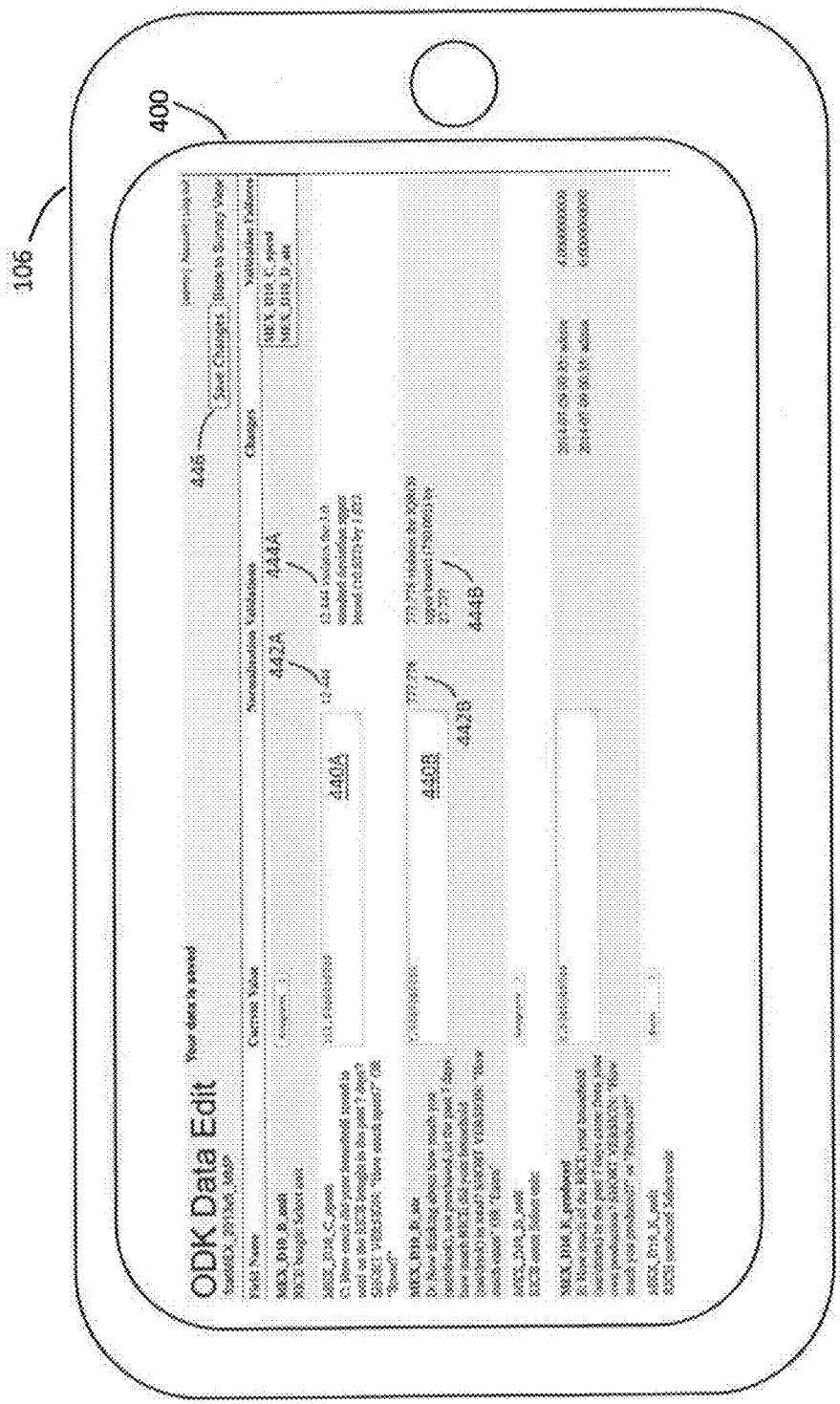

Additionally, and upon selection of hyperlink 402B of FIG. 4A, client device 106 may further obtain and present data (e.g., within GUI 400) that enables user 112 to provide input to client device 106 that process a modification to a normalized or raw data value to mediate an identified outlier in corresponding survey response data. For example, and as illustrated in FIG. 4C, user 112 may provide input to client device 106 (e.g., within editable survey boxes 440A and 440B) that modifies corresponding normalized values 442A and 442B associated with query identifiers "Mex_D10_C_spent" and "Mex_D10_D_ate," which data validation system 144 identified as outliers having associated validation errors 444A and 444B.

In some aspects, and upon input of the modified values into boxes 440A and/or 440B, user 112 may provide additional input that selects icon 446, which causes client device 104 to record and locally store the modified values, and associate the modified values with survey data. The associated survey data may include, among other things, data identifying a corresponding survey (e.g., "fcatMEX_2013v5_MMP") and corresponding query identifiers 442A and 442B. In certain aspects, client device 106 may package the modified values and associated survey data into a corresponding message along with an identifier of user 112, which client device 106 may transmit across network 120 to data validation system 144 using any of the communications protocols outlined above.

Referring back to FIG. 2, data validation system 144 may receive the message transmitted from client device 106 (e.g., in step 212), and may process the received message to identify the modified values and pointers to these values within the aggregated data (e.g., information identifying the survey associated with the modified values (e.g., based in the survey identifier within the received message), and the survey queries whose responses are subject to modification (e.g. based on the query identifiers within the received message)). In some aspects, data validation system 144 may access a portion of the aggregated data as stored within data repository 146 (e.g., associated with the identified survey, as described above), and may modify a portion of aggregated data to reflect the modified values included within the received message (e.g., in step 214).

In further aspects, data validation system 144 may access metadata that established an audit trail for the aggregated data, and update the accessed metadata to identify the modifications to the portions of the aggregated data, to identify user 112 as a modifying party, and further, to reflect the date and/or time of the modifications (e.g., in step 216). For example, and based on the updated metadata, a third party and/or auditor may be capable of not only modifications to the aggregated survey response data, but also the party and/or parties that requested the modifications. In some aspects, exemplary process 200 may then be complete in step 218.

As described above, the disclosed embodiments may enable one or more components of environment 100 to identify and mediate data outliers in survey response data collected by one or more mobile communications devices. The disclosed embodiments are, however, not limited to these exemplary data types, and in further embodiments, data consistent with the disclosed embodiments may include, but is not limited to enterprise data, customer data, purchase data, transaction data, financial data, employment data, geo-location data, and any additional or alternate data appropriate for review and analysis by business entity or organization 150. Further, the disclosed embodiments are not limited to micro-finance entities and institutions associated with environment 100, and in other embodiments, business entity or organization 150 may include, but is not limited to, a governmental entity, a non-governmental entity, a research entity, a stakeholder of the above, any additional or alternate entity that generates and analyzes aggregated data Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
a storage device; and
at least one processor coupled to the storage device, the storage device storing software instructions that are executable by the at least one processor, and the at least one processor being operative with the software instructions and configured to:
obtain aggregated data collected by a plurality of first communications devices associated with corresponding surveyors, the aggregated data comprising aggregated survey response data collected by the first communications devices;
detect at least one data outlier within the aggregated survey response data by applying a numerical technique comprising at least one of a linear regression analysis, conditional or robust regressions, an interquartile outlier check, or a standard deviation analysis, the data outlier corresponding to at least one element of the aggregated survey response data;
determine a magnitude by which the at least one data outlier exceeds a validation limit based on results from the numerical technique;
transmit information identifying the data outlier and at least a portion of the aggregated data that includes the data outlier to a second communications device associated with a survey manager, the information instructing the second communications device to:
generate a first graphical user interface displaying the portion of the aggregated survey response data that includes the data outlier, the data outlier being displayed visually distinguishable within the presented aggregated survey response data portion and being associated with a hyperlink, and
generate a second graphical user interface when the survey manager selects the hyperlink, the second graphical user interface comprising an editable box and displaying the magnitude by which the data outlier exceeds a validation limit, the second graphical user interface being different from the first graphical user interface;
in response to the transmitted information, receive a request to modify the aggregated data from the second communications device, the request comprising a value entered in the editable box;
perform operations that modify at least a portion of the aggregated data in accordance with the received request; and
generate metadata associated with the aggregated data, the metadata comprising:
effected modifications to the portion of the aggregated data; and
sources of the effected modifications.

2. The apparatus of claim 1, wherein the aggregated data comprises a first data portion and a second data portion, the first data portion including numerical values, and the second data portion including categorical data, and the categorical data including at least one non-numerical value.

3. The apparatus of claim 2, wherein the at least one processor is further configured to:
apply the numerical technique to a subset of the numerical data, the numerical data subset being characterized by a data parameter, the numerical technique being based on a corresponding data type of the numerical data; and identify the data outlier based on an outcome of the numerical technique.

4. The apparatus of claim 3, wherein the at least one processor is further configured to:

obtain information specifying a validation rule, the validation rule defining a valid relationship between elements of the aggregated data and the outcome of the numerical technique;

determine that at least one element of the aggregated data fails to exhibit the valid relationship with the outcome of the numerical technique; and establish the at least one aggregated survey response data element as the data outlier.

5. The apparatus of claim 2, wherein the at least one processor is further configured to:

determine a probability of an occurrence of a first element of the categorical data in conjunction with at least one second element of the categorical data;

determine that the probability fails to exceed at threshold value; and establish the first element of categorical data as the data outlier in response to the determination.

6. The apparatus of claim 2, wherein the at least one processor is configured to perform operations that normalize at least a portion of the numerical data in accordance with one or more normalization criteria, the normalization criteria being based on a number of household occupants.

7. The apparatus of claim 1, wherein the at least one processor is further configured to:

identify a first portion of the aggregated survey response data collected by a corresponding one of the first communications devices;

determine a metric indicative of a degree of separation between the first portion of the aggregate data and other portions of aggregated survey response data; and based on the determined metric, establish that at least one element of the first aggregated survey response data portion represents potential surveyor falsified data.

8. The apparatus of claim 1, wherein the at least one processor is further configured to:

detect a plurality of data outliers within the aggregated survey response data; and transmit information identifying the plurality of data outliers and at least a portion of the aggregated survey response data that includes the data outliers to the second communications device, the information identifying the plurality of data outliers comprising instructions to instruct the second communications device to display a list of identifiers of the plurality of first communications devices that are associated with a list of query identifiers.

9. The apparatus of claim 1, wherein the at least one processor is configured to re-format at least a portion of the aggregated survey response data in accordance with a pre-determined data format.

10. The apparatus of claim 1, wherein
the metadata further comprises one or more of:
information of surveyors associated with the portion of the aggregated data;
locations associated with the portion of the aggregated data;
survey questions associated with the portion of the aggregated data; and
survey client identifiers associated with the portion of the aggregated data;

the second graphical user interface further comprises:
a normalized value displayed between the editable box and the magnitude by which the data outlier exceeds the validation limit; and
the first graphical interface comprises:
a plurality of query identifiers for corresponding survey indices, each query identifier comprising raw response values and normalized response values.

11. The apparatus of claim 1, wherein
the surveyors are users of the plurality of first communication devices;
the survey manager is a user of the second communication device; and
the survey manager assigns surveyors one or more surveys to collect and process survey data.

12. A computer-implemented method, comprising:
obtaining, by at least one processor, aggregated data collected by a plurality of first communications devices associated with corresponding surveyors, the aggregated data comprising aggregated survey response data collected by the first communications devices;
detecting, by the at least one processor, at least one data outlier within the aggregated survey response data by applying a numerical technique comprising at least one of a linear regression analysis, conditional or robust regressions, an interquartile outlier check, or a standard deviation analysis, the data outlier corresponding to at least one element of the aggregated survey response data;
determining a magnitude by which the at least one data outlier exceeds a validation limit based on results from the numerical technique;
generating, by the at least one processor, an electronic command to transmit information identifying the data outlier and at least a portion of the aggregated data that includes the data outlier to a second communications device associated with a survey manager, the information instructing the second communications device to:
generate a first graphical user interface displaying the portion of the aggregated survey response data that includes the data outlier, the data outlier being displayed visually distinguishable within the presented aggregated survey response data portion, and being associated with a hyperlink, and
generate a second graphical user interface when the survey manager selects the hyperlink, the second graphical user interface comprising an editable box and displaying the magnitude by which the data outlier exceeds a validation limit, the second graphical user interface being different from the first graphical user interface;
in response to the transmitted information, receiving, by at least one processor, a request to modify the aggregated data from the second communications device, the request comprising a value entered in the editable box;
performing, by at least one processor, operations that modify at least a portion of the aggregated data in accordance with the received request; and
generating metadata associated with the aggregated data, the metadata comprising:
effected modifications to the portion of the aggregated data; and
sources of the effected modifications.

13. The method of claim 12, wherein the aggregated data comprises a first data portion and a second data portion, the first data portion including numerical values, and the second data portion including categorical data, and the categorical data including at least one non-numerical value.

14. The method of claim 13, further comprising:
applying numerical technique to a subset of the numerical data, the numerical data subset being characterized by a data parameter, the numerical technique being based on a corresponding data type of the numerical data; and
identifying the data outlier based on an outcome of the numerical technique.

15. The method of claim 14, further comprising:
obtaining information specifying a validation rule, the validation rule defining a valid relationship between elements of the aggregated data and the outcome of the numerical technique;
determining that at least one element of the aggregated data fails to exhibit the valid relationship with the outcome of the numerical technique; and
establishing the at least one aggregated data element as the data outlier.

16. The method of claim 13, further comprising:
determining a probability of an occurrence of a first element of the categorical data in conjunction with at least one second element of the categorical data;
determining that the probability fails to exceed at threshold value; and
establishing the first element of categorical data as the data outlier in response to the determination.

17. The method of claim 13, further comprising
performing operations that normalize at least a portion of the numerical data in accordance with one or more normalization criteria, the normalization criteria being based on a number of household occupants.

18. The method of claim 12, further comprising:
identifying a first portion of the aggregated survey response data collected by a corresponding one of the first communications devices;
determining a metric indicative of a degree of separation between the first portion of the aggregate data and other portions of aggregated survey response data; and
based on the determined metric, establishing that at least one element of the first aggregated survey response data portion represent potential surveyor falsified data.

19. The method of claim 12, further comprising:
detect a plurality of data outliers within the aggregated survey response data; and
transmit information identifying the plurality of data outliers and at least a portion of the aggregated survey response data that includes the data outliers to the second communications device, the information identifying the plurality of data outliers comprising instructions to instruct the second communications device to display a list of identifiers of the plurality of first communications devices that are associated with a list of query identifiers.

20. A tangible, non-transitory computer-readable medium storing instructions that, when executed by at least one processor, perform a method comprising:
obtaining aggregated data collected by a plurality of first communications devices associated with corresponding surveyors, the aggregated data comprising aggregated survey response data collected by the first communications devices;
detecting at least one data outlier within the aggregated survey response data by applying a numerical technique comprising at least one of a linear regression analysis, conditional or robust regression, and an interquartile check, or a standard deviation analysis, the data outlier corresponding to at least one element of the aggregated survey response data;
determining a magnitude by which the at least one data outlier exceeds a validation limit based on results from the numerical technique;
generating an electronic command to transmit information identifying the data outlier and at least a portion of the aggregated data that includes the data outlier to a second communications device associated with a survey manager, the information instructing the second communications device to:
generate a first graphical user interface displaying the portion of the aggregated survey response data that includes the data outlier, the data outlier being displayed visually distinguishable within the presented aggregated survey response data portion, and being associated with a hyperlink, and
generate a second graphical user interface when the survey manger selects the hyperlink, the second graphical user interface comprising an editable box and displaying the magnitude by which the data outlier exceeds a validation limit, the second graphical user interface being different from the first graphical user interface;
in response to the transmitted information, receiving a request to modify the aggregated data from the second communications device, the request comprising a value entered in the editable box;
performing operations that modify at least a portion of the aggregated data in accordance with the received request; and
generating metadata associated with the aggregated data, the metadata comprising:
effected modifications to the portion of the aggregated data; and
sources of the effected modifications.

* * * * *